L. F. SLEADE.
TUNNELING MACHINE.
APPLICATION FILED APR. 16, 1908.

945,623.

Patented Jan. 4, 1910.
9 SHEETS—SHEET 3.

WITNESSES
Geo. W. Naylor
Thos. J. Hooker

INVENTOR
Louis Franklin Sleade
BY Munn & Co
ATTORNEYS

L. F. SLEADE.
TUNNELING MACHINE.
APPLICATION FILED APR. 16, 1908.

945,623.

Patented Jan. 4, 1910.
9 SHEETS—SHEET 5.

WITNESSES

INVENTOR
Louis Franklin Sleade
BY
ATTORNEYS

L. F. SLEADE.
TUNNELING MACHINE.
APPLICATION FILED APR. 16, 1908.

945,623.

Patented Jan. 4, 1910.
9 SHEETS—SHEET 8.

WITNESSES

INVENTOR
Louis Franklin Sleade
BY
ATTORNEYS

UNITED STATES PATENT OFFICE.

LOUIS FRANKLIN SLEADE, OF DENVER, COLORADO, ASSIGNOR OF ONE-HALF TO WILLIS A. SHERWOOD, OF SILVERTON, COLORADO.

TUNNELING-MACHINE.

945,623.  Specification of Letters Patent.  Patented Jan. 4, 1910.

Application filed April 16, 1908. Serial No. 427,305.

*To all whom it may concern:*

Be it known that I, LOUIS FRANKLIN SLEADE, a citizen of the United States, and a resident of Denver, in the county of Denver and State of Colorado, have invented a new and Improved Tunneling-Machine, of which the following is a full, clear, and exact description.

The object of the invention is to provide a new and improved tunneling machine for driving tunnels, drifts and like passages for mining and other purposes, and arranged to insure a quick cutting of the rock and other material in front of the machine and delivering the cut material to the rear of the machine, and to feed the machine automatically forward while in action.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

The tunneling machine is mounted on a wheeled carriage A, in front of which is arranged a cutter B mounted to turn in a transverse direction and to reciprocate in the direction of its axis, to strike or deliver blows against the rock or other material, with a view to cut the material into small fragments and to form a tunnel, drift or like passage of circular shape sufficiently large to accommodate the tunneling machine and the track C on which the wheeled carriage A is fed automatically forward as the work progresses and as hereinafter more fully described. The material cut by the cutter B and dropping to the bottom of the passage is scooped up by the buckets of an elevator D located immediately behind the cutter B, and discharging the material into a chute D' which delivers the material to a conveyer E extending rearwardly and discharging into a chute E', directing the cut material into a car or other vehicle F traveling on the track C in the rear of the tunneling machine, the car F serving to carry the material out of the tunnel to a suitable dumping place.

The cutter B is rotated from a motor G, preferably of the electric type and mounted on the carriage A, and the cutter B is reciprocated by a motor H, preferably in the form of an internal combustion engine also mounted on the carriage A and connected with the electric motor G, to be partly actuated by the burning of the explosive mixture in the engine H itself and partly by the electric motor G in the sequence hereinafter more fully explained.

The detail construction of the wheeled carriage A is as follows, special reference being had to Figs. 1, 2, 3, 4, 5 and 15: The carriage frame is formed of two longitudinally-extending I-beams $A'$ rigidly connected with each other at their forward end by the front axle $A^2$ carrying the front wheels $A^3$ adapted to travel on rails $C'$ fastened to the ties $C^2$ of the track C. The beams $A'$ are rigidly connected with each other near their rear end by a plate $A^4$ formed with a depending king bolt $A^5$ journaled in a fifth wheel $A^6$, to which the rear axles $A^7$ are rigidly secured, the said rear axles $A^7$ carrying the rear wheels $A^8$ mounted to travel on the track rails $C'$. By the arrangement described the rear axles $A^7$ are pivotally connected by the fifth wheel $A^6$ with the king bolt $A^5$, to allow the carriage to travel on curved portions of the track C without danger of unduly straining its constituent parts.

The cutter B is arranged as follows, reference being had to Figs. 1, 2, 6, 7 and 8: The head $B'$ of the cutter B is in the form of a vertically disposed disk, on the front face of which are arranged the cutters or bits $B^2$, $B^3$, of which the bits $B^2$ have their front cutting edges arranged in the form of a cross, and each bit $B^2$ has its shank $B^4$ mounted to turn loosely in the head $B'$, the rear end of each shank $B^4$ being engaged by a cotter pin $B^5$, to hold the cutter against displacement but to allow the cutter or bit $B^2$ to turn freely.

Figure 7:
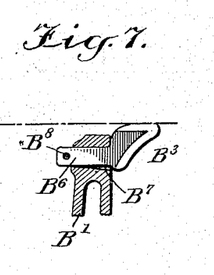
Fig. 7 is an enlarged sectional side elevation of part of the cutter head on the line 7—7 of Fig. 6.
Figure 8:
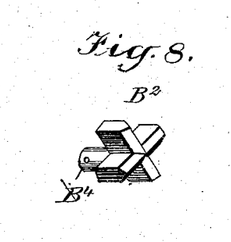
Fig. 8 is a perspective view of one of the revoluble cutters on the cutter head.

The cutters or bits $B^2$ are distributed irregularly on the face of the head $B'$, while the cutters $B^3$ are arranged at the peripheral end of the head $B'$ and have their cutting edges in ogee form, as plainly indicated in Fig. 7, the top cutting edge of each bit $B^3$ projecting beyond the peripheral edge of the head $B'$. Each of the bits $B^3$ is provided with a polygonal shank $B^6$, engaging an aperture $B^7$ in the head $B'$ and held against displacement by a cotter pin $B^8$ passing through the shank $B^6$ at the rear face of the head $B'$. The aperture $B^7$ is enlarged in a radial direction, so as to permit the shank $B^6$ to swing up or down, it being understood that by the use of the bits $B^3$ an ogee annular cut is made in the face of the rock or other material, and at each forward stroke of the cutter B the bits $B^3$ in striking the face are moved outward to the position shown in Fig. 7, and on the return stroke of the cutter B the bits $B^3$ swing inward out of engagement with the wall of the passage made by the cutter B, thus clearing the wall and insuring an easy reciprocating movement of the cutter B.

It is understood that by rotating and reciprocating the cutter B and by arranging the bits $B^2$, $B^3$ on the eccentrically-shaped head $B'$ (see Fig. 6) it is evident that the cutting edges of the bits come in contact with the entire face of the passage and thus cut the face into small fragments. The peripheral bits $B^3$ project beyond the bits $B^2$ and hence the bits $B^3$ form a smooth, annular channel along the margin of the face of the passage, it being understood that the shanks $B^4$, $B^6$ are relieved of strain at the time the bits strike the face of the passage, the strain being taken up by the head $B'$ against which the backs of the bits rest.

The head $B'$ of the cutter B is bolted or otherwise secured on a cutter shaft $B^9$ extending rearwardly (see Figs. 2 and 9), and terminating at its rear end in an annular flange $B^{10}$ held in a bearing or a cap I secured to the forward head $H'$ of the cylinder $H^2$ of the internal combustion engine H. The cylinder $H^2$ is mounted to slide in the direction of its axis in suitable guideways J, arranged on the frame of the carriage A, and by the connection above described the cutter B moves bodily with the said cylinder $H^2$.

In the cylinder $H^2$ is mounted to reciprocate a piston $H^3$ having its piston rod $H^4$ extending rearwardly and connected with a cross head $H^5$ mounted to slide in suitable guideways $H^6$ held on the frame of the carriage A. The cross head $H^5$ is connected by a pitman $H^7$ with the crank shaft $H^8$ of the internal combustion engine H, the crank shaft $H^8$ being journaled in suitable bearings arranged on the rear end of the carriage frame.

Figures 3, 16:
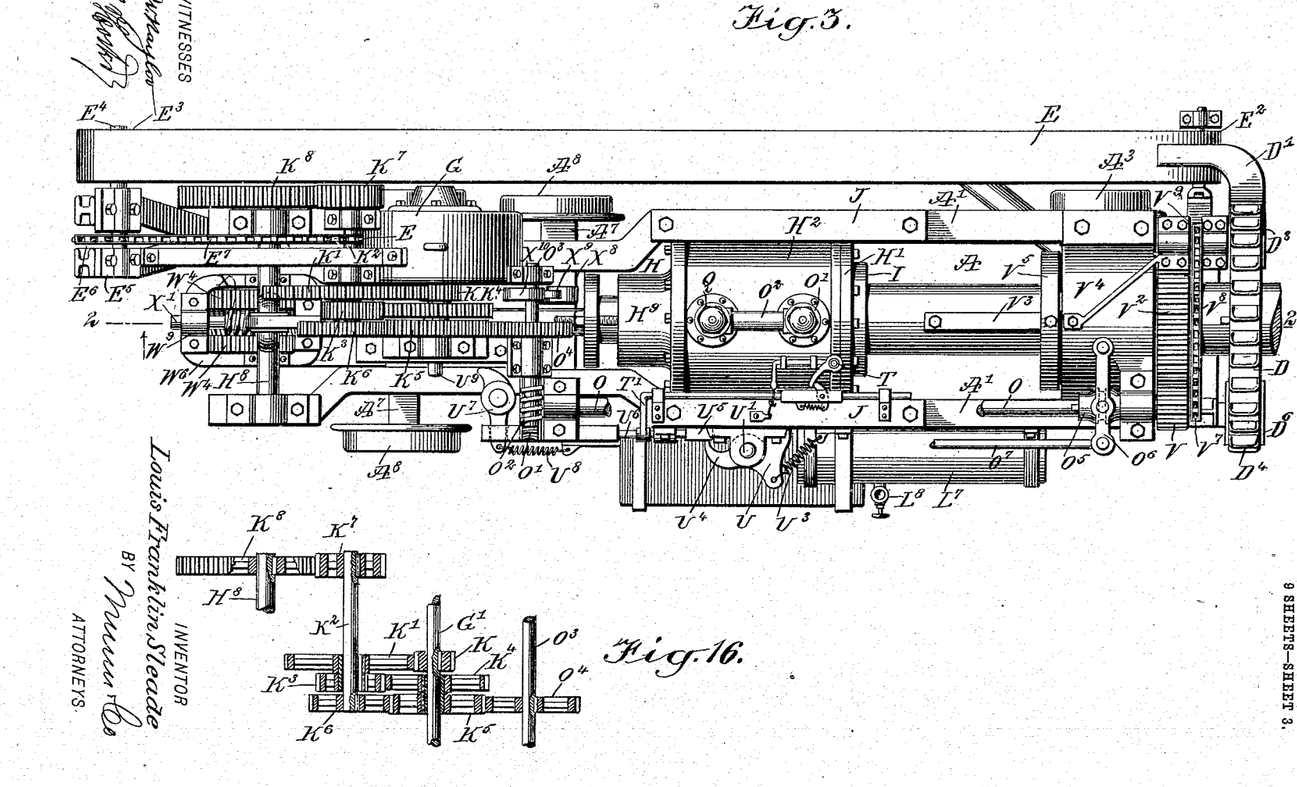
Fig. 3 is a plan view of the improvement, the cutter head being omitted.
Fig. 16 is a sectional plan view of the gearing for connecting the electric motor with the crank shaft of the internal combustion engine.
Figure 4:
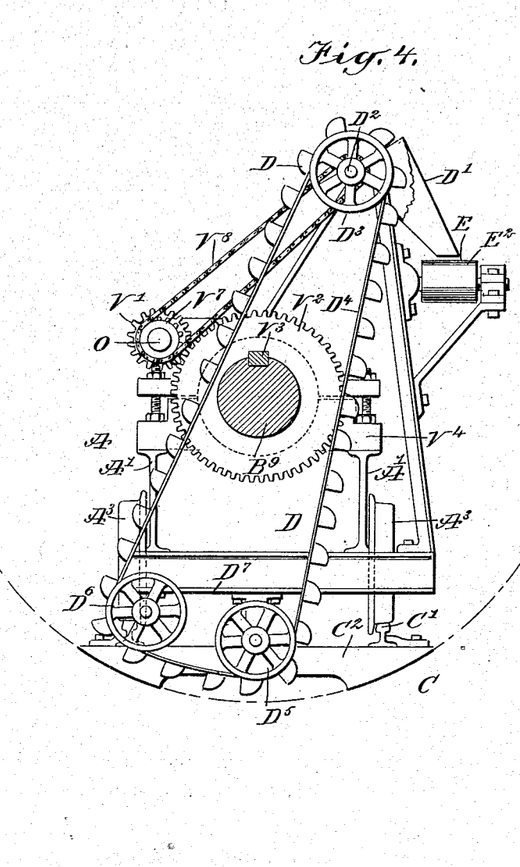
Fig. 4 is a cross section of the front end of the machine and showing more particularly the elevator and conveyer for conveying the cut material to the rear of the machine, the section being on the line 4—4 of Fig. 2.
Figure 5:
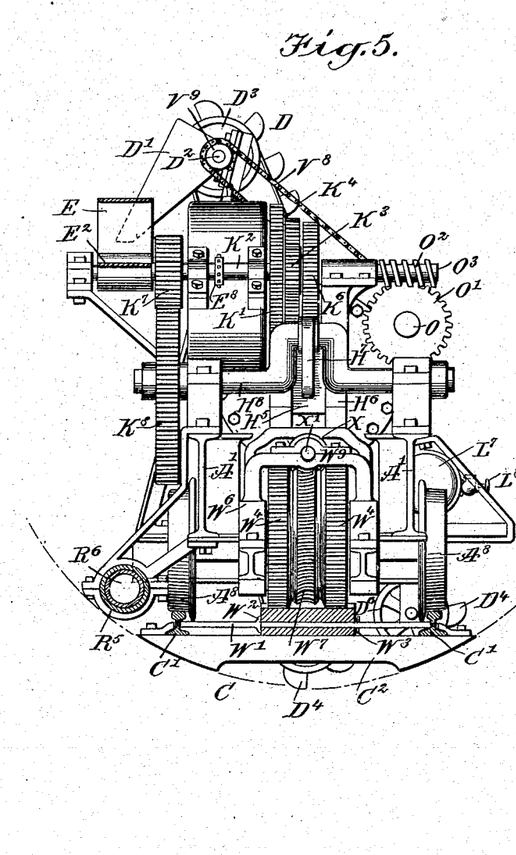
Fig. 5 is a rear end elevation of the improvement, the track rails, the exhaust pipe and the conveyer being in section.
Figure 6:
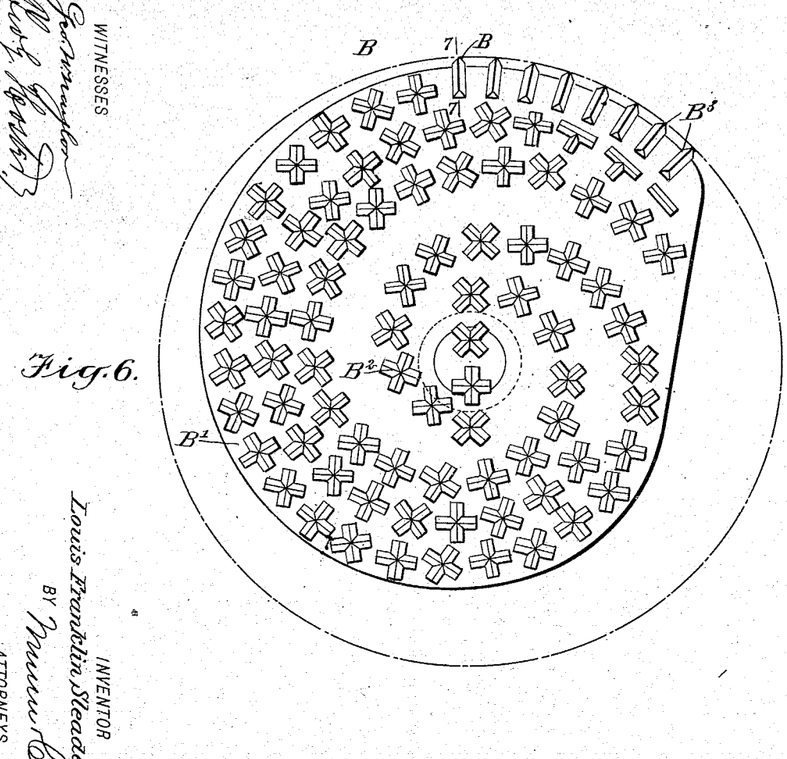
Fig. 6 is an enlarged face view of the cutter head.

The crank shaft $H^8$ is driven from the motor G, and for this purpose the crank shaft $H^8$ and the motor shaft $G'$ of the motor G are connected with each other by a gearing arranged as follows, special reference being had to Fig. 16. On the motor shaft $G'$ of the electric motor G is secured a pinion K in mesh with a gear wheel $K'$ mounted to rotate loosely on the transversely-extending shaft $K^2$ journaled in suitable bearings supported on the frame of the carriage A. On the hub of the gear wheel $K'$ is secured a pinion $K^3$ in mesh with a gear wheel $K^4$ mounted to rotate loosely on the motor shaft $G'$, and on the hub of the said gear wheel $K^4$ is secured another gear wheel $K^5$ in mesh with a gear wheel $K^6$ secured on the shaft $K^2$ above mentioned, and on this shaft $K^2$ is secured a pinion $K^7$ in mesh with a gear wheel $K^8$ secured on the crank shaft $H^8$. Thus when the electric motor G is running, the above-described gearing imparts a rotary motion to the crank shaft $H^8$, which by the pitman $H^7$, the cross head $H^5$ and piston rod $H^4$, imparts a continuous reciprocating motion to the piston $H^3$ in the slidable cylinder $H^2$.

Figure 12:
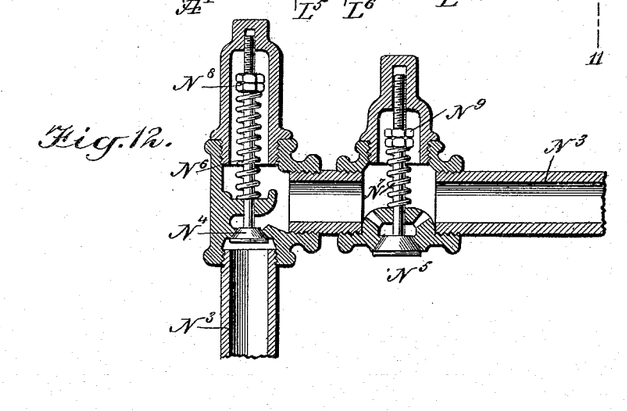
Fig. 12 is an enlarged sectional side elevation of the safety valves in the connection between the air compressor and the gasolene tank.
Figures 13, 14:
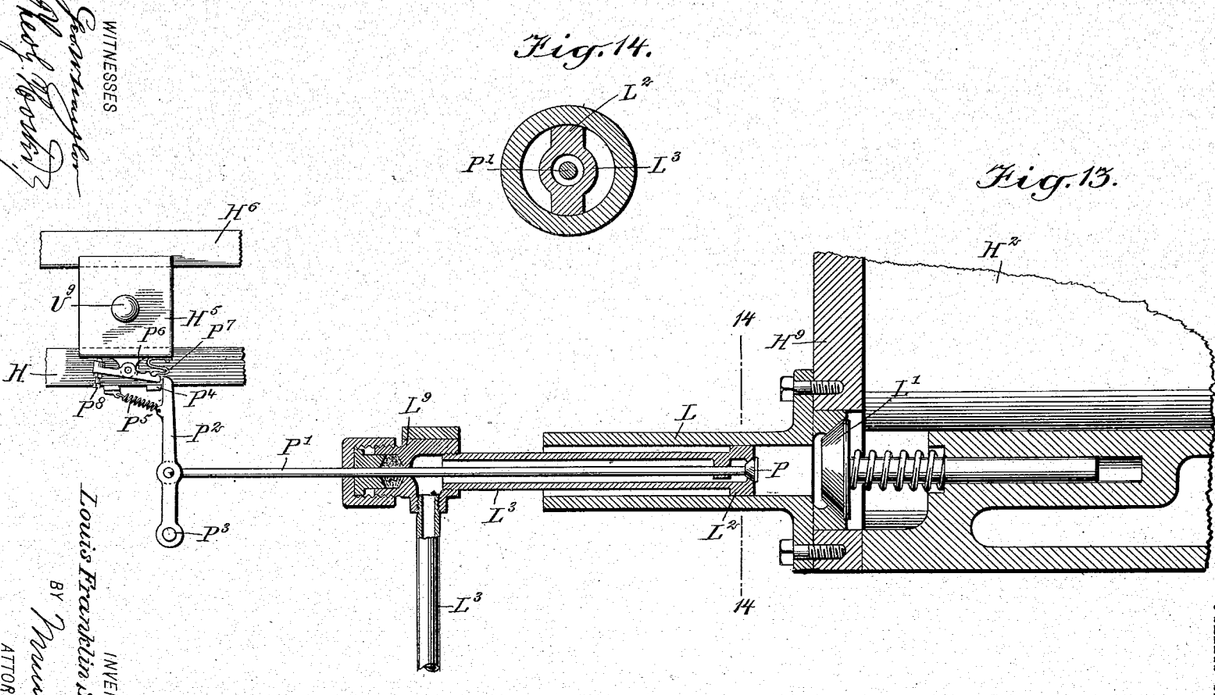
Fig. 13 is an enlarged sectional side elevation of the inlet mechanism for the internal combustion engine.
Fig. 14 is an enlarged cross section of the same on the line 14—14 of Fig. 13.
Figure 15:
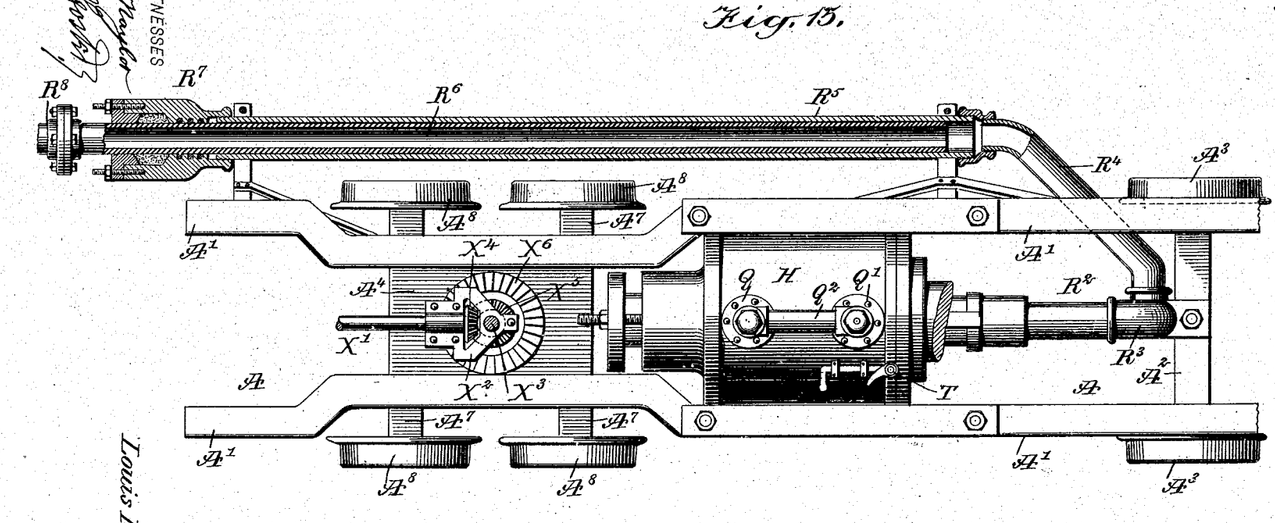
Fig. 15 is a plan view of the truck part of the internal combustion engine and exhaust pipe, the latter being shown in section.

The device for controlling the admission of the explosive mixture for the internal combustion engine H is arranged as follows, special reference being had to Figs. 1, 2, 3, 10, 11, 12, 13 and 14: The intake pipe L is bolted or otherwise secured to the rear head H⁹ of the cylinder H², and the inner end of this intake pipe L is normally closed by a spring-pressed valve L' (see Fig. 13). In the intake pipe L is mounted to slide the head L² of the supply pipe L³, connected by a coupling L⁴ with a short pipe L⁵ attached to a valve L⁶ connected with a tank L⁷ containing gasolene or a like fluid. The tank L⁷ is provided with a suitable filling valve L⁸ for filling the tank L⁷ with the desired amount of gasolene. Compressed air is forced into the tank L⁷ by the use of an air pump N actuated by an eccentric N' from a longitudinally-extending shaft O journaled in suitable bearings arranged on the frame of the carriage A. The shaft O is rotated from the electric motor G and for this purpose the rear end of the shaft O is provided with a worm wheel O' in mesh with a worm O² secured on a transverse shaft O³ journaled in suitable bearings and carrying a gear wheel O⁴ in mesh with the gear wheel K⁵, above mentioned, and forming part of the train of gear wheels connecting the motor shaft G' of the motor G with the crank shaft H⁸ of the internal combustion engine H. Now when the motor G is running, a rotary motion is transmitted to the shaft O by the gearing mentioned and consequently the air pump N is actuated, to pump air into the tank L⁷. The cylinder of the air pump N is provided with an inlet valve N² and a discharge pipe N³ connected with the tank L⁷, and in the said discharge pipe N³ is arranged the spring-pressed check valve N⁴ and the relief valve N⁵, shown in detail in Fig. 12. The springs N⁶, N⁷ for the valves N⁴, N⁵ serve to normally hold the same to their seats and the tension of the said springs can be adjusted by nuts N⁸, N⁹, as shown in Fig. 12. The spring N⁷ is somewhat heavier than the spring N⁶, so that the valve N⁵ normally remains closed while the pump N is working and pumping air into the tank L⁷, but when the pressure in the tank L⁷ exceeds normal pressure then the valve N⁵ opens to relieve the tank of any excess of pressure. Now the air tank L⁷ exerts a pressure on the gasolene contained therein, to force the gasolene through the supply pipe L³ into the intake pipe L, the said supply pipe L³ being however held periodically closed by a valve P, which when opened allows the gasolene to pass out of the pipe L³ and over the valve P, to be sprayed in the intake pipe L. The valve P is located at the inner end of the pipe L³ at the head L² and its stem P' extends rearwardly and through a suitable stuffing box L⁹ arranged on the pipe L³, as shown in Fig. 13. The valve stem P' connects with a lever P² fulcrumed at P³ on the frame of the carriage A, the free end of the lever P² normally resting against a stop P⁴. A spring P⁵ holds the lever P² normally against the stop P⁴, and the said lever P² receives a periodical swinging motion in a forward direction by a lever P⁶ fulcrumed on the cross head H⁵ of the internal combustion engine H. A spring P⁷ presses one end of the lever P⁶ while the other end thereof is provided with a set screw P⁸ abutting against the cross head H⁵ and serving to adjust the lever P⁶ relative to the free end of the lever P². When the piston H³ is at the end of its rearward stroke, as indicated in dotted lines in Fig. 10, then the lever P⁶ is in engagement with the free end of the lever P² (see Figs. 10 and 13), and when the piston H³ moves forward then the lever P⁶ imparts a swinging motion to the lever P², whereby the valve P is opened, and consequently the gasolene in the supply pipe L³ can pass into the intake pipe L, and by way of the valve L' into the rear end of the cylinder H². At the same time air is drawn into the cylinder H² by way of the intake pipe L, which is open at the outer end, it being understood that the head L² is cut out on the sides to allow the air to pass the head and to mix with the sprayed gasolene at the entrance to the cylinder H². As the cross head H⁵ advances, the lever P⁶ finally disengages the lever P², to allow the spring P⁵ to swing the lever P² back to its normal position of rest, and in doing so to close the valve P. Thus the admission of the gasolene in the cylinder H² is cut off. Now by adjusting the set screw P⁸ on the lever P⁶, the contact of the lever P⁶ with the lever P² during the forward stroke of the cross head H⁵ can be regulated, so as to keep the valve P open for a longer or a shorter time. On the return stroke of the cross head H⁵, the lever P⁶ readily passes over the free end of the lever P², as the said lever P⁶ is yieldingly mounted.

Figure 2:
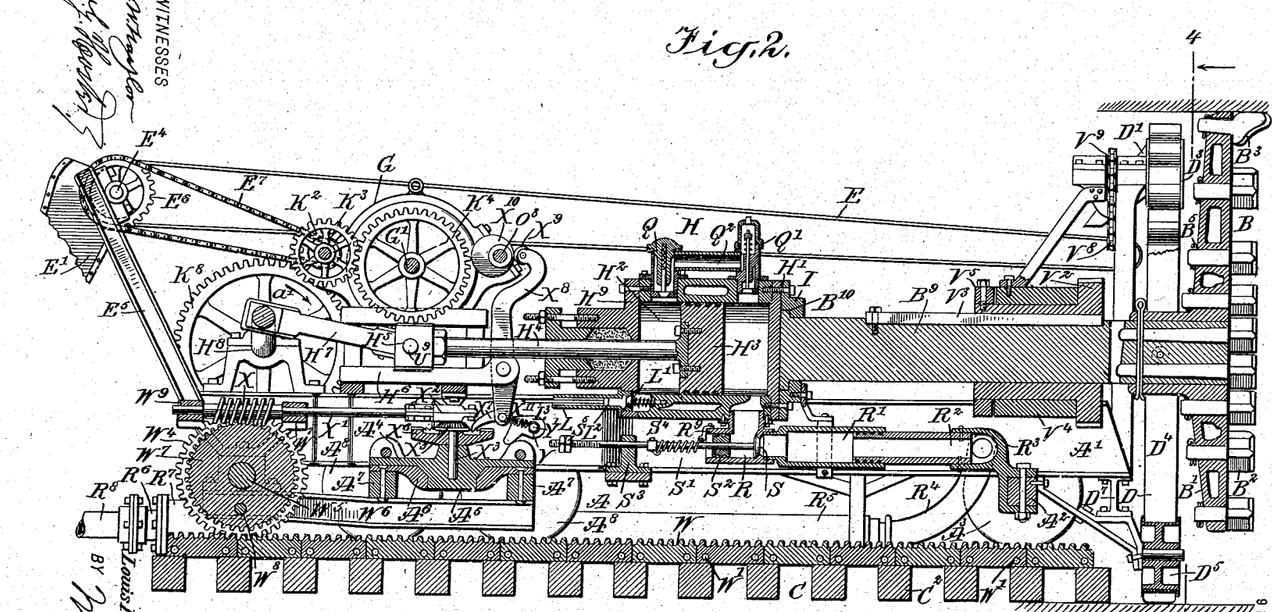
Fig. 2 is a longitudinal central section of the same on the line 2—2 of Fig. 3.

The rear and front ends of the cylinder H² are connected with each other by valves Q, Q' and a pipe Q² connecting the valves Q and Q' with each other (see Fig. 2). The valve Q is arranged on the rear end of the cylinder H² and opens outwardly, while the valve Q' is arranged on the forward end of the cylinder H² and opens inwardly, so that the gaseous mixture passing into the rear end of the cylinder H², as above explained, is forced by way of the valves Q, Q' and the pipe Q² into the forward end of the cylinder H² at the time the said cylinder H² slides forward by the force of a previous explosion, as hereinafter more fully described.

The forward end of the cylinder H² is provided with an exhaust chamber R provided with a pipe R' telescoping a pipe R² held on an elbow R³, bolted or otherwise fastened to the front axle A³. Thus when the cylinder H² reciprocates the pipe R' slides on the pipe R². The elbow R³ is connected by a pipe R⁴ with a longitudinally extending pipe $R^5$ (see Fig. 15), supported on one side of the carriage A, and in this pipe $R^5$ telescopes another pipe $R^6$ extending through the head $R^7$ held on the rear end of the pipe $R^5$. The pipe $R^6$ is coupled to a line of pipe $R^8$ extending to the outside of the tunnel, so that the exhaust gases pass from the cylinder $H^2$ by way of the piping described, to the outside of the tunnel and thus prevent vitiating of the air in the tunnel.

The connection of the exhaust chamber R with the pipe $R'$ is normally closed by a valve S, having its stem $S'$ extending through a piston $S^2$ held in a cylinder $R^9$ formed in the exhaust chamber R. The outer end of the stem $S'$ extends through a guide $S^3$ fixed on the frame of the carriage A, and a spring $S^4$ is coiled on the stem $S'$ and is attached at one end to the exhaust chamber R and at the other end to a collar on the stem $S'$, so as to hold the valve S normally on its seat, as shown in Fig. 2. The terminal of the valve stem $S'$ is provided with adjustable nuts $S^5$ adapted to abut against the guide $S^3$ at the time the cylinder $H^2$ reaches the forward end of its stroke, so that the valve S is moved into an open position, and consequently the products of combustion in the forward end of the cylinder $H^2$ can pass by way of the exhaust chamber R into the pipe $R'$, and from the latter through the line of pipes to the outside of the tunnel.

The explosive mixture passing from the rear end of the cylinder $H^2$ to the front end thereof is compressed during the forward travel of the piston $H^3$ in the cylinder $H^2$ at the time the cylinder $H^2$ is held locked in a rearmost position, and when the piston $H^3$ is at the end of its forward stroke and the crank shaft $H^8$ stands in a dead center position, then this compressed explosive mixture in the forward end of the cylinder $H^2$ is ignited by a suitable igniting device T, and the force of the resultant explosion now forces the unlocked cylinder $H^2$ in a forward direction, to cause the cutter B to strike the face of the tunnel. During this forward movement of the cylinder $H^2$ the piston $H^3$ is practically stationary, and when the cylinder $H^2$ nears the end of its forward stroke then the exhaust valve Q is drawn open so that the products of combustion are exhausted from the forward end of the cylinder $H^2$. It will also be noticed that during this forward movement of the cylinder $H^2$ the gaseous mixture previously drawn into the rear end of the cylinder $H^2$ is forced through the valve Q into the pipe $Q^2$, and finally passes by way of the valve $Q'$ into the forward end of the cylinder $H^2$, the springs of the valves Q and $Q'$ holding the same closed until the products of combustion have been exhausted from the forward end of the cylinder $H^2$, so that the incoming gaseous mixture fills the forward end of the cylinder $H^2$.

As the motor G is running continually, it is evident that the piston $H^3$ in moving on its rearward stroke draws the cylinder $H^2$ along until the latter is in its rearmost position, and then the cylinder $H^2$ is locked temporarily against movement, while the piston $H^3$ moves at the forward or compression stroke, to compress the gaseous mixture in the forward end of the cylinder $H^2$. The above-described operation is then repeated, that is, another explosion takes place in the forward end of the cylinder $H^2$ at the time the crank shaft $H^8$ is in a dead center position, and consequently the cylinder $H^2$ is again forced forward, to cause the cutter B to deliver another blow against the face of the tunnel.

Figure 1:
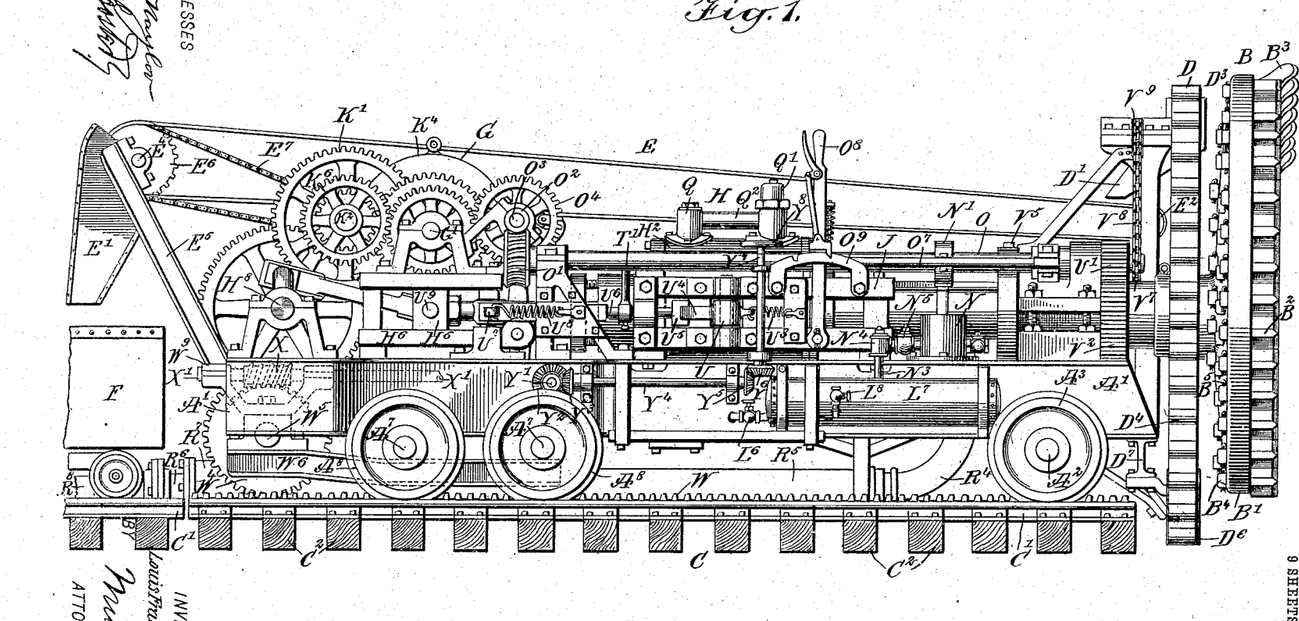
Figure 1 is a side elevation of the improvement.
Figure 9:
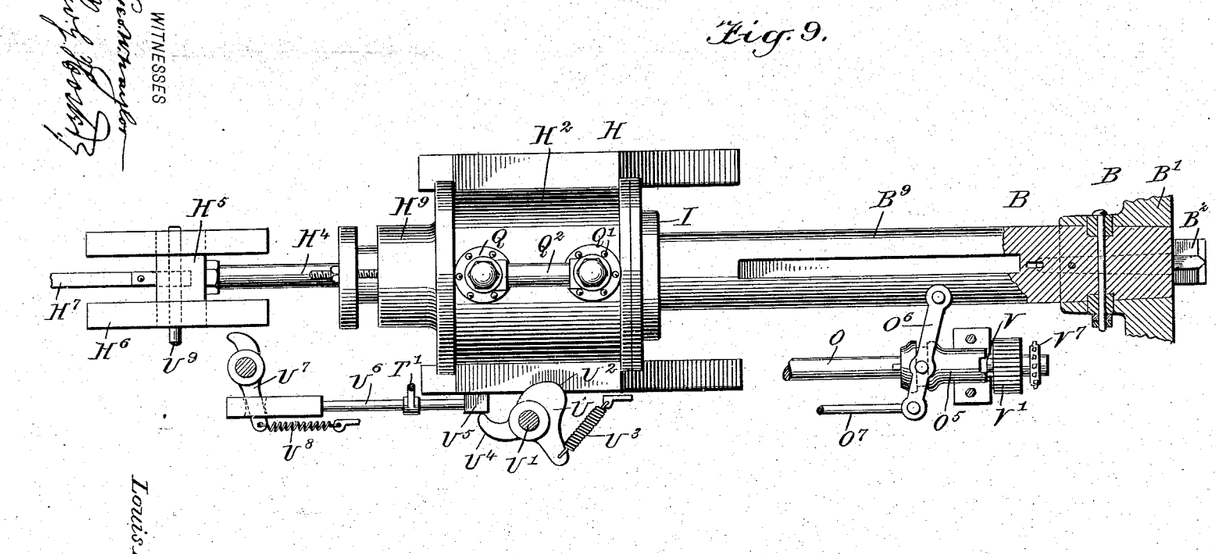
Fig. 9 is a plan view of the internal combustion engine, the forward end of the cutter shaft and the cutter head being shown in section.

The device for temporarily locking and unlocking the cylinder $H^2$ when in its rearmost position is arranged as follows, reference being had to Figs. 1, 3 and 9: A locking lever U is fulcrumed at $U'$ on the guideway J in which slides the cylinder $H^2$, and the said locking lever U is adapted to engage a notch $U^2$ in one side of the cylinder $H^2$, and the lever U is pressed on by a spring $U^3$ to swing the locking lever U into engagement with the said notch $U^2$ on the rearward stroke of the piston $H^3$ and the cylinder $H^2$. The locking lever U is provided with an arm $U^4$ adapted to be engaged by the head $U^5$ of a rod $U^6$, to hold the locking lever U normally in locking position, as shown in Figs. 1, 3 and 9. The rod $U^6$ is engaged by a lever $U^7$ fulcrumed on the frame of the carriage A, and the said lever is pressed on by a spring $U^8$, to move the rod $U^6$ forwardly into engagement with the arm $U^4$ of the locking lever U and to hold the locking lever U in locking position. The lever $U^7$ extends into the path of a pin $U^9$ on the cross head $H^5$ of the internal combustion engine, so that when the said cross head $H^5$ about reaches the end of its forward stroke, the pin $U^9$ engages and imparts a swinging motion to the lever $U^7$, whereby the rod $U^6$ is drawn rearward and the head $U^5$ moves out of engagement with the arm $U^4$ of the locking lever U. This takes place immediately previous to actuating the igniting device T, and as the cylinder $H^2$ is now unlocked it is free to move forward by the force of the explosion within the cylinder $H^2$, as above explained. It is understood that the locking lever U after being unlocked by the head $U^5$ moves readily out of the notch $U^2$, on the forward motion of the cylinder $H^2$. When the cylinder $H^2$ and the piston $H^3$ return together, as previously stated, the locking lever U reëngages the notch $U^2$ by the action of the spring $U^3$, and the head $U^5$ slides back under the arm $U^4$ by the action of the spring U⁸ and after the pin U⁹ has left the lever U⁷ on the return stroke of the cross head H⁵.

The electric igniting device T is preferably of the make and break type, and is actuated by a rod T' held on the rod U⁶, so that the igniting of the explosive mixture in the forward end of the cylinder H² takes place immediately after the cylinder H² is unlocked. As the igniting device T may be of any approved construction, it is not deemed necessary to show or describe the same in detail.

The cutter B is rotated from the electric motor G, as previously mentioned, and for this purpose the shaft B⁹ of the cutter B is geared with the shaft O driven from the motor G, as before explained. The detail arrangement is as follows, special reference being had to Figs. 1, 2, 3 and 9: A clutch member O² is mounted to turn with and to slide near the forward end of the shaft O, and this clutch member O⁵ is adapted to engage a clutch member V, formed or secured on a pinion V', in mesh with a gear wheel V² mounted on the shaft B⁹ and engaging a key V³, to permit the shaft B⁹ to slide relative to the gear wheel V² and to rotate the shaft B⁹ on turning the gear wheel V². The gear wheel V² is mounted to turn in a bearing V⁴ supported on the frame of the carriage A, and the rear end of the hub of the gear wheel V² is provided with a collar V⁵ to hold the gear wheel V² against longitudinal movement in its bearing V⁴. The clutch member O⁵ is engaged by a shifting lever O⁶ fulcrumed on the bearing V⁴, and the shifting lever is pivotally connected by a link O⁷ (see Fig. 1) with a hand lever O⁸ under the control of the operator, and fulcrumed on the bearing J for the cylinder H². The hand lever O⁸ is adapted to be locked to a notched segment O⁹ held on the bearing J, so as to hold the clutch member O⁵ in or out of engagement with the clutch member V. Now when the shaft O is rotated and the clutch member O⁵ is in mesh with the clutch member V, then the pinion V' is rotated, so that the gear wheel V² is turned and with it the shaft B⁹ and the cutter B. When it is desired to stop the rotation of the cutter B, it is only necessary for the operator to swing the hand lever O⁸ over to the left, to disengage the clutch member O⁵ from the clutch member V.

The elevator D is actuated in unison with the rotation of the cutter B, and for this purpose the following arrangement is made: On the pinion V' is secured a sprocket wheel V⁷ connected by a sprocket chain V⁸ with a sprocket wheel V⁹ secured on the shaft D² carrying the top wheel D³ of the elevator D (see Figs. 4 and 5), and over this wheel D³ passes the endless bucket belt D⁴ also passing under the idlers D⁵, D⁶ journaled in bearings attached to a cross beam D⁷ secured to the under side of the I-beam A' at the front end of the carriage A. Now when the pinion V' is rotated as above described, then a rotary motion is transmitted by the sprocket wheels V⁷ and V⁹ and the sprocket chain V⁸ to the shaft D², so that the wheel D³ is rotated and consequently a traveling motion is given to the bucket belt D⁴ to cause the lowermost buckets to scoop up the loose material in the bottom of the tunnel and to carry the same upward and discharge the loose material into the chute D' from which the loose material passes onto the conveyer E. The conveyer E is in the form of an endless belt passing over pulleys E², E³, of which the pulley E² is journaled at the front end of the carriage A, while the pulley E³ is secured on a shaft E⁴ journaled in a bracket E⁵ attached to the rear end of the frame of the carriage A. On the shaft E⁴ (see Fig. 3) is secured a sprocket wheel E⁶ engaged by a sprocket chain E⁷ passing over a sprocket wheel E⁸ secured on the shaft K², so that when the electric motor G is running and the shaft K² is rotated, then a rotary motion is given to the shaft E⁴ by the sprocket wheels E⁸, E⁶ and the sprocket chain E⁷, and the rotary motion of the shaft E⁴ causes the wheel E³ to turn, so that a traveling motion is given to the endless belt of the conveyer E. Now the material delivered by the chute D' on the forward end of the conveyer E is carried rearwardly and discharged into the chute E', directing the material to the car F, as before explained.

In order to feed the tunneling machine gradually forward according to the cut produced by the cutter B, the following arrangement is made, reference being had to Figs. 1, 2, 3, 5 and 15: On the ties C² and approximately midway between the thack rails C' is secured a sectional rack W, each section of which rests at its end on adjacent ties C² (see Fig. 2), and each section is engaged by a plurality of transverse rods W', riveted or otherwise fastened at their ends to the webs of the track rails C' (see Fig. 5). Each cross rod W' is provided with a shoulder W² engaging one side of the rack section, and in each rod W' is inserted a cotter pin W³ engaging the other side of the rack section, to hold the latter against transverse movement. Now as the rods W' are fastened to the rails C' they hold the rack in place on the ties and against longitudinal movement. By the arrangement described, the rack sections can be conveniently operated as the work progresses. Two gear wheels W⁴ are in mesh with the rack W (see Fig. 5), and the said gear wheels W⁴ are mounted loosely on a transverse shaft W⁵ journaled in suitable bearings carried by an auxiliary frame W⁶, bolted or otherwise fastened to the rear axles A⁷ of the carriage A, and on the said shaft W⁵ and extending between the gear wheels W⁴ is secured a worm wheel W⁷ adapted to be fastened to the gear wheels W⁴ by a removable transverse pin W⁸. Now when the worm wheel W⁷ is rotated and the pin W⁸ is in position then the gear wheels W⁴ are turned, and as the said gear wheels W⁴ are in mesh with the rack W, it is evident that the tunneling machine is fed forward. When it is desired to run the tunneling machine backward, then the pin W⁸ is withdrawn, and consequently the gear wheels W⁴ run loose on the rack W, independent of the worm wheel W⁷ now at a standstill. The worm wheel W⁷ is in mesh with a worm X secured on the rear end of a longitudinally-extending shaft X' journaled at its forward end in a bearing X², fulcrumed on a vertical shaft X³ centrally engaging the plate A⁴ carrying the king bolt A⁵ (see Figs. 2 and 15). The rear end of the shaft X' is journaled in bearings W⁹ attached to the auxiliary frame W⁶ above mentioned. On the forward end of the shaft X' is secured a bevel gear wheel X⁴ in mesh with a bevel gear wheel X⁵ secured on the shaft X³, on which is also secured a ratchet crown wheel X⁶ engaged by a pawl X⁷ fulcrumed on the lower end of a lever X⁸ fulcrumed on the guideway H⁶ of the cross head H⁵. On the upper end of the lever X⁸ is journaled a friction roller X⁹ in peripheral engagement with a cam wheel X¹⁰ secured on the shaft O³, previously described, and driven from the motor G. Now when the motor G is running and the shaft O³ rotates, then the cam wheel X¹⁰ imparts a swinging motion to the lever X⁸, which by the pawl X⁷ imparts an intermittent rotary motion to the crown wheel X⁶, that is, so that the shaft X³ and the bevel gear wheel X⁵ are rotated, and the rotary motion of the bevel gear wheel X⁵ is transmitted by the bevel gear wheel X⁴ to the shaft X', which by the worm X rotates the worm wheel W⁷, and as the latter is connected by the pin W⁸ with the gear wheels W⁴, it is evident that the gear wheels W⁴ travel forward on the rack W, thus propelling the tunneling machine forward. A spring X¹⁴ presses the lever X⁸, to hold the friction roller X⁹ in contact with the cam wheel X¹⁰.

In order to regulate the throw of the lever X⁸ and to turn the crown wheel X⁶ more or less, according to the amount cut in the face of the tunnel by the cutter B, the following arrangement is made: The lower end of the lever X⁸ is adapted to be engaged by a cam Y secured on a transverse shaft Y' journaled in the frame of the carriage A, and on the outer end of this shaft Y' (see Fig. 1) is secured a bevel gear wheel Y² in mesh with a bevel gear wheel Y³ secured on a longitudinally-extending shaft Y⁴ journaled in suitable bearings arranged on the carriage frame. On the forward end of the shaft Y⁴ is secured a bevel gear wheel Y⁵ in mesh with a bevel gear wheel Y⁶ attached to the lower end of a vertically-disposed shaft Y⁷, carrying at its upper end a hand wheel Y⁸ under the control of the operator, so that the latter can turn the shaft Y⁷ and thus impart a rotary motion to the shaft Y⁴ by the bevel gear wheels Y⁶, Y⁵, and the rotary motion of the shaft Y⁴ is transmitted by the bevel gear wheels Y³, Y² to the shaft Y', to cause the cam Y thereof to swing the lever X⁸ against the tension of its spring X¹¹, so as to hold the friction roller X⁹ in a desired position relative to the cam wheel X¹⁰, so that the cam wheel X¹⁰ imparts more or less swinging motion to the lever X⁸ according to the position of the cam Y. Thus more or less feed can be given to the machine according to the amount of material cut in a given time by the cutter B.

The operation is as follows: When the several parts of the machine are in the position illustrated in Figs. 1, 2, 3, 4 and 5, and the electric motor G is running, then the cutter B is rotating, the elevator D and the conveyer E are running and the crank shaft H⁸ turns in the direction of the arrow a', so that the piston H³ of the internal combustion engine H travels forward in the cylinder H², now locked by the locking lever U in a rearmost position. An explosive charge is drawn into the rear end of the cylinder H² while the advancing piston H³ presses the charge in the front end of the cylinder H², and when the crank of the crank shaft H⁸ reaches a forward dead center position, then the cylinder H² is unlocked and the igniting device T is actuated, so that the explosive charge in the cylinder H² is ignited and the force of the resultant explosion now drives the cylinder H² forward and with the cutter B, whereby the latter strikes or delivers a blow on the face of the tunnel, thus cutting the said face by the action of the bits B², B³, in the manner previously explained. The cut material drops down onto the bottom of the tunnel and is scooped up by the buckets of the elevator D, which delivers the cut material by way of the chute D' onto the conveyer E, which carries the cut material rearward and delivers it by way of the chute E' into the car F. As the crank shaft H⁸ keeps on turning in the direction of the arrow a', it moves out of the forward dead center position, and in doing so causes the piston H³ to travel rearwardly, and as the piston H³ is near the rear cylinder head H⁹ with a gas cushion between them, it is evident that the cylinder H² is carried along, that is, is drawn back and with it the cutter B. When the cylinder H² and the piston H³ reach the end of their rearmost stroke, the cylinder H² is again locked in place by the locking lever U, and the piston H³ now begins its next forward stroke, and the above operation is repeated.

From the foregoing, it will be seen that by the arrangement described, the cutter B successively delivers blows against the face of the tunnel and while the cutter head B' is rotated, so that every part of the face is reached by the bits B², B³, and as the machine is automatically fed forward according to the amount cut from the face of the tunnel, it is evident that the machine is capable of doing a large amount of work without requiring much attention on the part of the attendant.

It will be noticed that a perfect cylindrical tunnel is cut in the rock or other material.

It is understood that as the machine advances additional track is laid, and sections of the rack W are added, the ties C² being rounded at the under side near the ends thereof to fit the bottom of the tunnel, and the middle portion of the bottom of the ties C² is cut out (see Figs. 4 and 5), to permit any water that may be encountered to run out of the tunnel.

Figure 10:
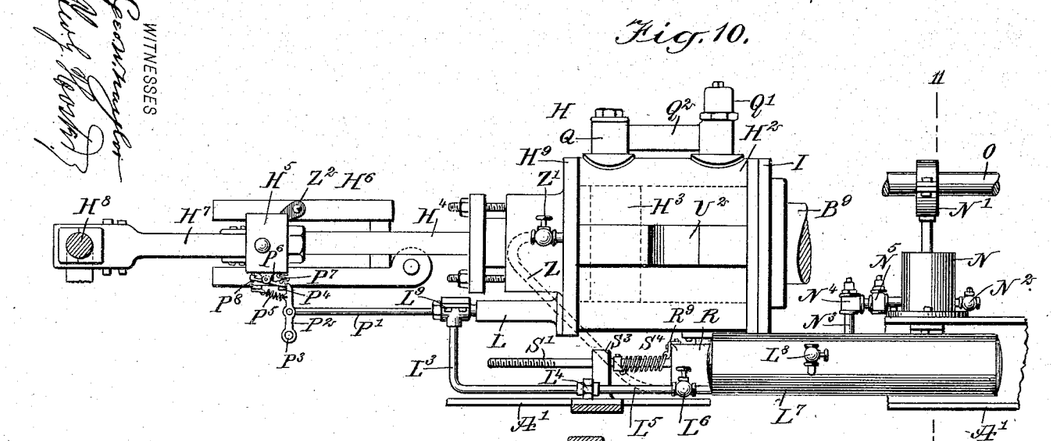
Fig. 10 is a side elevation of the internal combustion engine and adjacent parts, illustrating the arrangement for working the machine on starting the tunnel until an even face or collar is cut.
Figure 11:
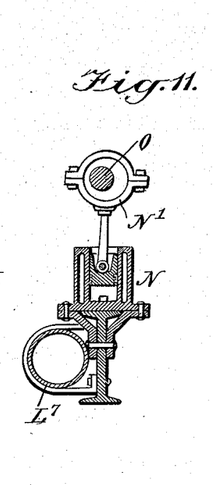
Fig. 11 is a transverse section of the air compressor, the section being on the line 11—11 of Fig. 10.

When starting the bore of a tunnel along a slope or the like, it is desirable to strike but light blows with the cutter B, until an even face or collar is cut on the breast of the tunnel, and for this purpose some parts of the machine are temporarily changed and the operation is somewhat different from the one above described, special reference being had to Fig. 10. The internal combustion engine H is not run in this instance as a combustion engine, and hence no gasolene is used and the tank L⁷ is not filled with gasolene but charged with compressed air supplied by the air pump N. The tank L⁷ is now directly connected with the rear end of the cylinder H², and for this purpose the pipe L⁵ is removed and the valve L⁶ is connected by a high-pressure hose Z with a valve Z' on the rear cylinder head H⁹. The nuts S⁵ on the exhaust valve stem S' are removed, so that the exhaust valve S remains in a closed position. The crank shaft gear wheel K⁸ is temporarily removed from the crank shaft H⁸ and the piston H³ is temporarily locked in a rearmost position (shown in dotted lines in Fig. 10) by the use of a dog Z² temporarily bolted to the cross head guideway H⁶ and engaging the cross head H⁵, as shown in Fig. 10. The electric motor G is now started and as this motor is now disconnected from the crank shaft H⁸ by the removal of the gear wheel K⁸, the engine H is not actuated from the electric motor G, but the latter drives the shaft O, so that the air pump N is actuated and fills the tank L⁷ with compressed air. The valves L⁶, Z' are now opened to allow the compressed air to pass from the tank L⁷ by way of the valves L⁶, Z' and the hose Z into the rear end of the cylinder H², and by way of the by-pass (the valves Q, Q' and pipe Q²) into the front end of the cylinder H², to equalize the pressure on both sides of the piston H³ held against forward movement by the locking of the cross head H⁵ by the dog Z². The air pressure in the cylinder H² cannot escape by way of the intake pipe L, as the valve L' is held in a closed position by the air pressure and the latter cannot escape by way of the exhaust chamber R, as the exhaust valve S is held in a closed position by the air pressure. In order to allow the use of a high pressure in the tank L⁷, the springs N⁶, N⁷ of the valves N⁴, N⁵ are adjusted correspondingly. After the cylinder H² is charged with a desired pressure, the electric motor G is stopped, the valves L⁶, Z' are closed and the hose Z is removed. The dog Z² is next removed and the crank shaft gear wheel K⁸ is replaced, after which the electric motor G is started up, to cause the cylinder H² and the piston H³ to travel in unison with each other and with an air cushion on either side of the piston H³, so that the blows struck by the cutter B are light, as the cutter can readily rebound owing to the high-pressure air cushion in the cylinder H². The operator manipulates the hand wheel Y⁸, to control the forward feeding of the entire machine according to the nature and quantity of the material encountered in the slope, that is, can feed the machine faster or slower as required. When the face or collar of the tunnel is complete and even for all the bits to strike against simultaneously, then the electric motor is stopped and the necessary changes are made, to permit running the machine with the electric motor G and the internal combustion engine H going as above described.

Having thus described my invention, I claim as new and desire to secure by Letters Patent:

1. A tunneling machine, comprising a revoluble cutter head, an electric motor for rotating the said cutter head, an internal combustion engine for imparting a reciprocating motion to the said cutter head in a forward direction, and means for connecting the said electric motor with the said internal combustion engine for imparting a return movement to the said cutter head.

2. A tunneling machine, comprising a revoluble cutter head, an electric motor for rotating the said cutter head, and an internal combustion engine having a slidable cylinder connected with the said cutter head and the engine having a piston connected with the said electric motor.

3. A tunneling machine, comprising a cutter head, and an internal combustion engine having a slidable combustion cylinder actuated by the force of the explosive mixture, and connected with the said cutter head for moving the latter axially.

4. A tunneling machine, comprising a cutter head, an internal combustion engine having a slidable combustion cylinder connected with the said cutter head for moving the latter axially, in a forward direction, and means connected with the piston of the said internal combustion engine for moving the said piston and cylinder in a rearward direction.

5. A tunneling machine, comprising a revoluble cutter head, an internal combustion engine having a slidable combustion cylinder and a reciprocating piston, means for connecting the shaft of the said cutter head with the said cylinder to move with and turn thereon, and separate means for imparting a reciprocating motion to the said piston.

6. A tunneling machine, comprising a revoluble cutter head, an internal combustion engine having a slidable cylinder and a reciprocating piston, a connection between the shaft of the said cutter head and the said cylinder to permit the shaft to move with and turn on the said cylinder, and an electric motor connected with the crank shaft of the said internal combustion engine for imparting a reciprocating motion to the said piston.

7. A tunneling machine, comprising a revoluble cutter head, an internal combustion engine having a slidable cylinder and a reciprocating piston, means for connecting the shaft of the said cutter head with the said cylinder to permit the shaft to move with and turn on the said cylinder, an electric motor connected with the crank shaft of the said internal combustion engine for imparting a reciprocating motion to the said piston, and means connecting the said electric motor with the said cutter head for rotating the same.

8. A tunneling machine having a cutter head, a bodily reciprocable engine, said engine including a cylinder and a piston, means for securing the shaft of the cutter head to the cylinder whereby the said cutter head moves bodily with the said cylinder, means for reciprocating the piston, means for producing an explosion in the cylinder to impart an independent movement to the latter in one direction relative to the said piston, and means for temporarily holding the piston stationary while the cylinder is moving in said direction.

9. A tunneling machine having a cutter head, a bodily reciprocable engine including a cylinder and a piston, means for reciprocating the piston, means for connecting the said cutter head with the said cylinder to permit the cutter head to move bodily with the said cylinder, means for producing an explosion in the cylinder to impart an independent movement to said cylinder in one direction relative to said piston, and means for temporarily holding the piston stationary while the cylinder is moving in said direction, the said piston on its return stroke returning the said cylinder and cutter head.

10. A tunneling machine having a cutter head, a bodily reciprocable engine including a cylinder and a piston, means for reciprocating the piston, means for connecting the said cutter head with the said cylinder whereby the said cutter head moves bodily with the said cylinder, means for producing an explosion in the cylinder to impart an independent movement to the cylinder in one direction, relative to the said piston, means for temporarily holding the piston stationary during the said independent movement of the cylinder, the said piston having a forward movement independent of the said cylinder, and means for holding the cylinder in a rearmost position against movement at the time of said forward movement of the piston.

11. A tunneling machine, comprising a wheeled carriage, an internal combustion engine mounted on the said carriage and having a slidable cylinder adapted to be moved in one direction by the explosion of the charge, a piston in said cylinder adapted to move the cylinder in the opposite direction, a revoluble cutter head, a connection between the cutter head and said cylinder, whereby the cutter head moves bodily with and rotates on the cylinder, an electric motor mounted on the said carriage and connected with the said cutter head for rotating the same, means for reciprocating the piston from the said electric motor, and means actuated from the said electric motor for feeding the said carriage automatically forward.

12. A tunneling machine, comprising a wheeled carriage, an internal combustion engine mounted on the said carriage and having a slidable cylinder movable in one direction by the explosion of the charge, a revoluble cutter head, a connection between the cutter head and the cylinder to permit the cutter head to move bodily with and rotate on the said cylinder, an electric motor mounted on the said carriage and connected with the said cutter head for rotating the same, an elevator held on the said carriage in the rear of the said cutter head, and a conveyer mounted lengthwise on the said carriage and onto which discharges the said elevator.

13. A tunneling machine, comprising a wheeled carriage, an internal combustion engine mounted on the said carriage and having a slidable cylinder and a piston, means for producing an explosion in the engine, a revoluble cutter head connected with the cylinder to move bodily with and rotate on the latter, an electric motor mounted on the said carriage and connected with the said cutter head for rotating the same, the said motor being also connected with the said piston to reciprocate the latter, an elevator held on the said carriage in the rear of the said cutter head, a conveyer mounted lengthwise on the said carriage and onto which discharges the said elevator, means for actuating the said elevator from the said electric motor, and means for actuating the said conveyer from the said electric motor.

14. A tunneling machine, comprising a wheeled carriage, an internal combustion engine mounted on the said carriage and having a slidable cylinder, means for producing an explosion in the engine to move the cylinder in one direction, a revoluble cutter head connected with the said cylinder to move bodily with and rotate on the latter, an electric motor mounted on the said carriage and connected with the said cutter head for rotating the same, and manually adjustable feeding means actuated from the said electric motor for automatically feeding the said carriage forward.

15. In a tunneling machine, a cutter head, an engine having a slidable cylinder, means for connecting the said cutter head with the forward head of the cylinder to permit the cutter head to move bodily with the cylinder and to turn thereon, a motor for actuating the piston of the said engine, and means for forming a compressed air cushion in the said cylinder.

16. In a tunneling machine, a cutter head, an engine having a slidable cylinder and a piston, a connection between the cylinder and the said cutter head to permit the latter to move bodily with the cylinder and to turn thereon, a motor, means for connecting the motor with the piston of the engine for actuating the said engine, and an air compressor actuated from the said motor and connected with the said cylinder for supplying the latter with compressed air.

17. In a tunneling machine, a cutter head, an engine having a slidable cylinder and a piston, a connection between the cylinder and the said cutter head to permit the latter to move bodily with the cylinder and to turn thereon, a motor, means for connecting the motor with the piston of the engine for actuating the said engine, an air compressor actuated from the said motor and connected with the said cylinder for supplying the latter with compressed air, and a connection between the ends of the said cylinder to allow the compressed air to pass to both ends of the cylinder.

18. In a tunneling machine, a cutter head, an engine having a slidable cylinder and a piston, a connection between the cylinder and the said cutter head for the latter to move bodily with the cylinder and to turn thereon, a motor, means for connecting the motor with the piston of said engine, an air compressor actuated from the said motor and connected with the said cylinder for supplying the latter with compressed air, and a relief pressure device in the connection between the said air compressor and the said slidable cylinder.

19. A tunneling machine, comprising a cutter head having a shaft provided with an annular flange at its rear end, a gear wheel mounted on the said shaft to rotate the latter and to allow the shaft to slide axially therein, an electric motor geared with the said gear wheel, and an internal combustion engine having a slidable combustion cylinder provided with a bearing on its forward head in which the said flange of the shaft is loosely held, to permit the shaft to move axially with the cylinder and to allow the shaft to turn.

20. A tunneling machine, comprising a cutter head having a shaft, a gear wheel mounted on the said shaft to rotate the latter and to allow the shaft to slide axially therein, an electric motor geared with the said gear wheel, an internal combustion engine having a piston and a slidable cylinder, the cylinder being connected with the said shaft to move the latter axially and to allow the shaft to turn, means for causing an explosion in the cylinder to move the latter relatively to the piston, and a connection between the shaft of the said electric motor and the shaft of the said internal combustion engine to reciprocate the piston.

21. A tunneling machine, comprising a cutter head, an internal combustion engine having a piston and a slidable cylinder, means for reciprocating the piston, means for causing an explosion in the cylinder to move the cylinder relatively to the piston, means for connecting the said cutter head with the said cylinder to permit the cutter head to move bodily with the cylinder and to turn thereon, and a locking device for the said cylinder to hold the latter against movement during a portion of the stroke of the piston.

22. A tunneling machine, comprising a cutter head, an internal combustion engine having a piston and a slidable cylinder, a connection between the said cutter head and the said cylinder to permit the cutter head to move bodily with the cylinder and to turn thereon, means for producing an explosion in the engine to move the cylinder relatively to the piston, a locking device for the said cylinder to hold the latter against movement during a portion of the stroke of the engine piston, means for reciprocating the piston, and means actuated from the cross head of the said engine for controlling the said locking device.

23. A tunneling machine, comprising a cutter head, an internal combustion engine having a slidable cylinder and a piston, a connection between the said cutter head and the said cylinder to permit the cutter head to move bodily with the cylinder and to turn thereon, an electric motor connected with the shaft of the said engine for reciprocating the engine piston, means for producing an explosion in the engine to move the cylinder relatively to the piston, and a locking device for the said cylinder to hold the latter against movement during a portion of the stroke of the engine piston.

24. A tunneling machine, comprising a cutter head, mounted to turn and to slide in the direction of its axis, a motor comprising an internal combustion engine having a slidable cylinder connected with the said cutter head to reciprocate the latter, a piston mounted to reciprocate in said cylinder, a second motor connected with the cutter head for rotating the latter, the said second motor being also connected with the shaft of the said first motor to reciprocate the piston of the latter, and a periodical locking device for the said slidable cylinder and controlled by a movable part of the said first motor.

25. A tunneling machine, comprising a cutter head mounted to turn and to slide in the direction of its axis, an internal combustion engine having a slidable cylinder connected with the said cutter head to reciprocate the latter, an electric motor geared with the shaft of the said engine to reciprocate the piston of the said internal combustion engine, a periodically actuated locking device for the said slidable cylinder and controlled by a moving part of the said internal combustion engine, and means for producing an explosion in the said internal combustion engine at the time the said slidable cylinder is unlocked and the piston of the internal combustion engine is at the end of its forward stroke.

26. A tunneling machine provided with an engine having a slidable cylinder, a reciprocating piston, means for reciprocating the piston, the said cylinder being moved rearward by the rearward movement of the piston, a locking lever engaging the said cylinder to hold the latter temporarily at the end of its rearward stroke and while the piston moves forward in the said cylinder, an actuating device controlled from the cross head of the engine and adapted to swing the said locking lever out of engagement with the said cylinder at the time the piston reaches the end of its forward stroke, and means for producing an explosion in the cylinder to move the cylinder forward.

27. A tunneling machine provided with an engine having a slidable cylinder, a reciprocating piston, means for reciprocating the piston, the said cylinder being moved rearward by the rearward movement of the piston, a locking lever engaging the said cylinder to hold the latter temporarily at the end of its rearward stroke and while the piston moves forward in the said cylinder, a slide having a head for engaging the said locking lever to hold the latter in locking position, a spring-pressed slide lever engaging the said slide, a projection on the cross head of the engine engaging the said slide lever at the time the piston reaches the end of its forward stroke, and means for producing an explosion in the cylinder to move the cylinder forward.

28. In a tunneling machine an engine having a slidable cylinder, a locking device for holding rigid the said cylinder against movement, a piston in the said cylinder, a cross head connected with the said piston, a temporary locking device for the said cross head, a connection between the ends of the said cylinder, and an air compressor temporarily connected with the said cylinder for charging the latter with compressed air.

29. A tunneling machine provided with a cutter head, an engine having a slidable cylinder connected with and reciprocating with the said cutter head, means for producing an explosion in the cylinder to move the cylinder forward, an exhaust valve for the exhaust of the said cylinder, and a fixed member engaging the stem of the said exhaust valve for opening the latter at the time the cylinder reaches the end of its forward stroke.

30. A tunneling machine provided with a cutter head, an engine having a slidable cylinder connected with and reciprocating with the said cutter head, means for producing an explosion in the cylinder to move the cylinder forward, an exhaust valve for the exhaust of the said cylinder, and a fixed member forming a guide through which the stem of the said exhaust valve extends, the said valve stem being provided with means for engaging said fixed member to move the valve into an open position at the time the cylinder reaches the end of its forward stroke, the said exhaust pipe having telescoping sections, of which one is fixed and the other moves with the tunneling machine.

31. A tunneling machine, comprising a cutter head mounted to turn and to slide axially, a motor for imparting a reciprocating motion to the said cutter head in a forward direction, a second motor for rotating the said cutter head, and means for connecting the said second motor with the first motor for imparting a return movement to the cutter head.

32. A tunneling machine, comprising a cutter head, reciprocating means connected with the cutter head for imparting a reciprocating motion to the cutter head in a forward direction, a motor connected with the cutter head for rotating the same, and means actuated from said motor for imparting a return movement to the cutter head.

33. In a tunneling machine, an engine having a slidable cylinder, the said cylinder having its ends connected, a piston in the said cylinder, means for temporarily locking the piston against movement, an air compressor temporarily connected with the said cylinder, and a motor for actuating the air compressor to charge the cylinder with compressed air.

34. In a tunneling machine, a revoluble cutter head, a slidable cylinder connected with the cutter head for imparting axial movement to the cutter head, a motor connected with the cutter head for rotating the same, and means actuated from said motor for imparting movement in one direction to the said cylinder.

35. In a tunneling machine, a bodily reciprocable cylinder and piston, a cutter head connected with the cylinder to turn thereon and to slide axially, mechanism for rotating the cutter head, and a motor for actuating said mechanism and the said piston.

36. In a tunneling machine, a reciprocable cylinder, a cutter head connected with the cylinder to turn thereon and to slide axially with the cylinder, a piston in the cylinder, means for moving the cylinder in one direction, and means for reciprocating the piston, the said cylinder being moved in the other direction by the movement of the piston.

37. In a tunneling machine a revoluble cutter head provided with cutters, a motor for rotating the cutter head, and an engine having a slidable cylinder connected with the cutter head for imparting axial movement to the cutter head, the engine having a piston within said cylinder and actuated from said motor.

38. In a tunneling machine, a revoluble cutter head, mechanism for rotating the cutter head, a motor for actuating said mechanism, a slidable cylinder connected with the cutter head for imparting axial movement to the cutter head, the said cylinder having a compressed air cushion at its ends, and a piston in said cylinder and actuated by said motor.

39. In a tunneling machine, a revoluble cutter head provided with cutters, a slidable cylinder provided with an air cushion at its ends, a connection between the said cutter head and the said cylinder to permit the cutter head to move axially with the cylinder and to turn thereon, a piston mounted in the said cylinder, a motor for connection with the said piston to move the cylinder and piston in unison in one direction, and a connection between the said motor and the cutter head for rotating the latter.

In testimony whereof I have signed my name to this specification in the presence of two subscribing witnesses.

LOUIS FRANKLIN SLEADE.

Witnesses:
   THOS. S. BATTIN,
   WM. Q. ROSE.